(12) United States Patent
Yamada

(10) Patent No.: US 6,466,563 B1
(45) Date of Patent: Oct. 15, 2002

(54) CDMA MOBILE STATION AND CDMA TRANSMISSION METHOD

(75) Inventor: Daisuke Yamada, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/147,831

(22) PCT Filed: Jul. 16, 1998

(86) PCT No.: PCT/JP98/03202

§ 371 (c)(1),
(2), (4) Date: Mar. 16, 1999

(87) PCT Pub. No.: WO99/04591

PCT Pub. Date: Jan. 28, 1999

(30) Foreign Application Priority Data

Jul. 19, 1997 (JP) ............................................. 9-209642

(51) Int. Cl.[7] .......................... H04B 7/216; H04B 1/38; H04J 3/06; H04Q 7/20
(52) U.S. Cl. ........................ 370/342; 370/503; 455/522; 455/574
(58) Field of Search .......................... 370/310–311, 318, 370/320–321, 324, 335, 342, 350, 369–370, 470, 500, 503, 510; 455/69, 502, 517, 522, 574

(56) References Cited

U.S. PATENT DOCUMENTS

| | | | | |
|---|---|---|---|---|
| 5,896,374 A | * | 4/1999 | Okumura et al. | 370/311 |
| 6,034,952 A | * | 3/2000 | Dohi et al. | 370/335 |
| 6,088,324 A | * | 7/2000 | Sato | 370/335 |
| 6,144,860 A | * | 11/2000 | Komatsu | 455/522 |

FOREIGN PATENT DOCUMENTS

JP      8-008871      1/1996

OTHER PUBLICATIONS

"Experiment On Transmission Of Mobile Radio Access Using Coherent Multicode DS–CDMA", Technical Report of IEICE, RCS95–80, dated Oct. 20, 1995 with English Abstract.
English language abstract of JP 8–008871.

* cited by examiner

*Primary Examiner*—Wellington Chin
*Assistant Examiner*—Maikhanh Tran
(74) *Attorney, Agent, or Firm*—Stevens, Davis, Miller & Mosher, LLP

(57) ABSTRACT

Burst frame generation circuit 307 generates burst data solely made of pilot symbols and transmission power control symbols. Transmission interval control circuit 308 controls the transmission interval of said burst data N times (N: a natural number) one slot at the end of transmission and maintains synchronization while reducing power consumption.

21 Claims, 9 Drawing Sheets

WITH TRANSMISSION DATA

TRANSMISSION STANDBY
(NO TRANSMISSION DATA)

TRANSMISSION COMPLETED
(NO TRANSMISSION DATA)

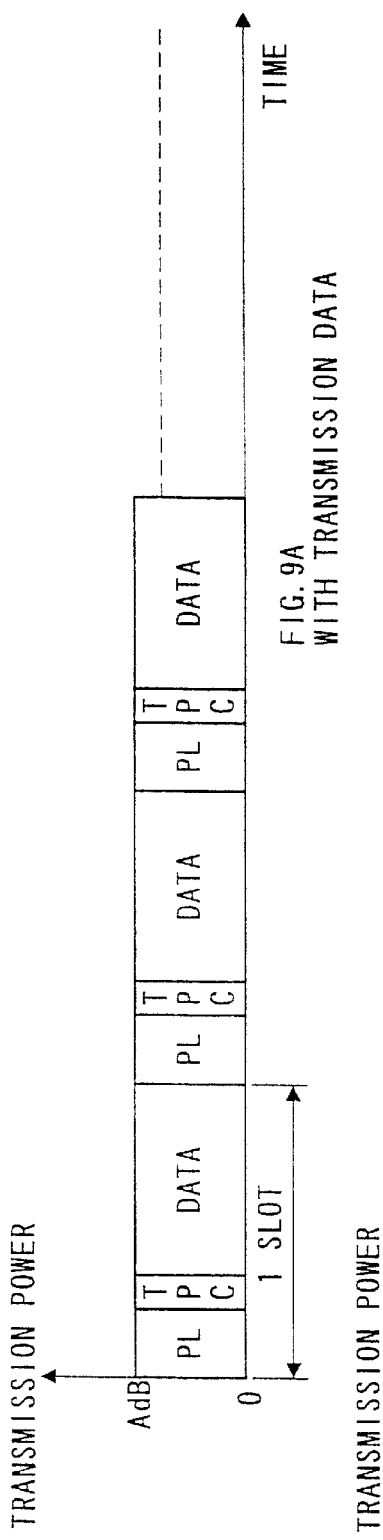
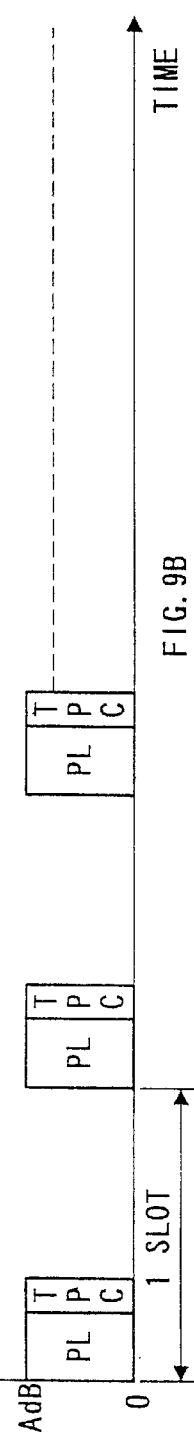
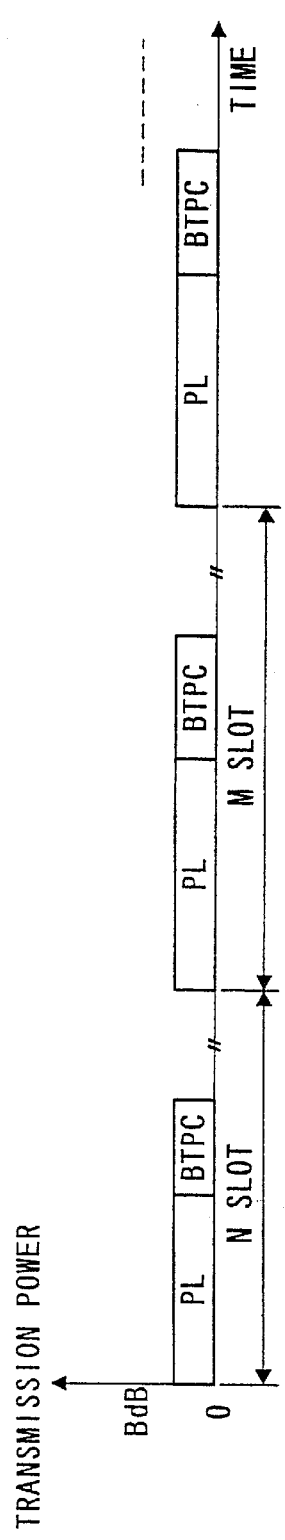
FIG. 9A WITH TRANSMISSION DATA
FIG. 9B TRANSMISSION STANDBY (NO TRANSMISSION DATA)
FIG. 9C TRANSMISSION COMPLETED (NO TRANSMISSION DATA)

CDMA MOBILE STATION AND CDMA TRANSMISSION METHOD

TECHNICAL FIELD

The present invention relates to CDMA mobile station apparatuses and CDMA transmission methods such as digital car telephones and portable telephones used for cellular radio communication systems.

BACKGROUND ART

For radio communication systems such as digital car telephones and portable telephones, a multiple access system is used in which multiple mobile station apparatuses perform communications with a single base station apparatus simultaneously. Recently, as one of these line switching systems using this multiple access system, a CDMA (Code Division Multiple Access) system is used because of its high frequency utilization efficiency.

Data transmission timing in a conventional CDMA mobile station apparatus is explained using a timing chart shown in FIG. 1.

FIG. 1A is a timing chart showing data transmission timing during data transmission. Pilot symbols (hereafter referred to as "PL") and transmission power control symbols (hereafter referred to as "TPC") are periodically inserted into data, forming a frame. When a portion from the start of a PL to the start of the next PL is calculated as one slot, one frame generally consists of 16 slots, 10 ms.

FIG. 1B is a timing chart showing data transmission timing during transmission on transmission standby. "During transmission on transmission standby" means a time corresponding to less than K frames after completion of data transmission or a time corresponding to less than L frames in which a CRC detection of received data resulted in NG (K and L are predetermined constants). On transmission standby, the CDMA mobile station apparatus transmits burst data in which only a PL and TPC are written and other bits are left in blank for each slot.

Here, the CRC (Cyclic Redundancy Check) detection means processing for detecting errors in received data by judgment by a comparison between a received CRC bit which is given with a coefficient of a remainder polynomial obtained by dividing an information bit by an n-th degree generating function, and a CRC bit generated from the received data. A complete match between the two means that the received data have been received correctly (OK) and mismatch of at least one element means that the received data contain errors (NG).

FIG. 1C is a timing chart showing the data transmission timing at the end of transmission. The end of transmission means a state in which at least K frames are detected after data transmission is completed and at least L frames in which a CRC detection of the received data resulted in NG are detected.

As shown in FIG. 1C, the conventional CDMA mobile station apparatus stops transmission of burst data in a certain time after the end of communication in order to reduce power consumption of batteries by a transmission amplifier.

Because of this, the conventional CDMA mobile station apparatus above takes time to establish synchronization when restarting communication, and it has to send a dummy signal, an unnecessary signal, instead of data in the meantime until synchronization is established, resulting in a problem of reducing the transmission efficiency.

DISCLOSURE OF INVENTION

A first objective of the present invention is to provide a CDMA mobile station apparatus and CDMA transmission method which can maintain established synchronization with a base station apparatus while reducing power consumption when there are no data to be transmitted.

This objective is achieved by controlling the transmission interval of burst data to N slots (N: a natural number) when a certain time has elapsed after the end of data transmission.

BRIEF DESCRIPTION OF DRAWINGS

FIGS. 9A, 9B and 9C are 2nd timing chart showing the transmission timing of data in the CDMA mobile station apparatus in Embodiment 3 of the present invention.

BEST MODES FOR CARRYING OUT THE INVENTION

With reference now to the attached drawings, the best modes for carrying out the present invention are explained in detail.

EMBODIMENT 1

Figure 1:
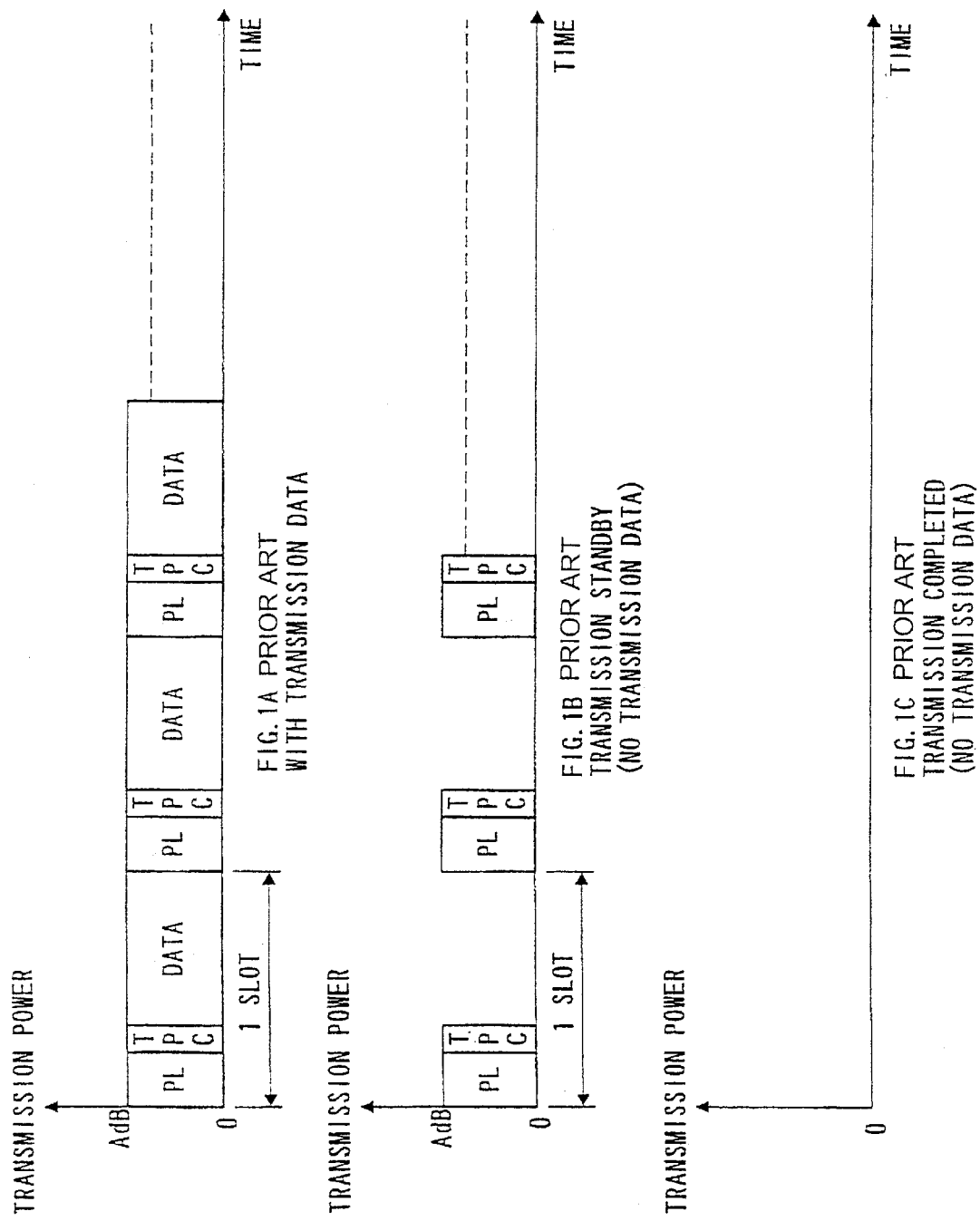
FIGS. 1A, 1B, and 1C are timing charts showing the transmission timing of data in a conventional CDMA mobile station apparatus.
Figure 2:
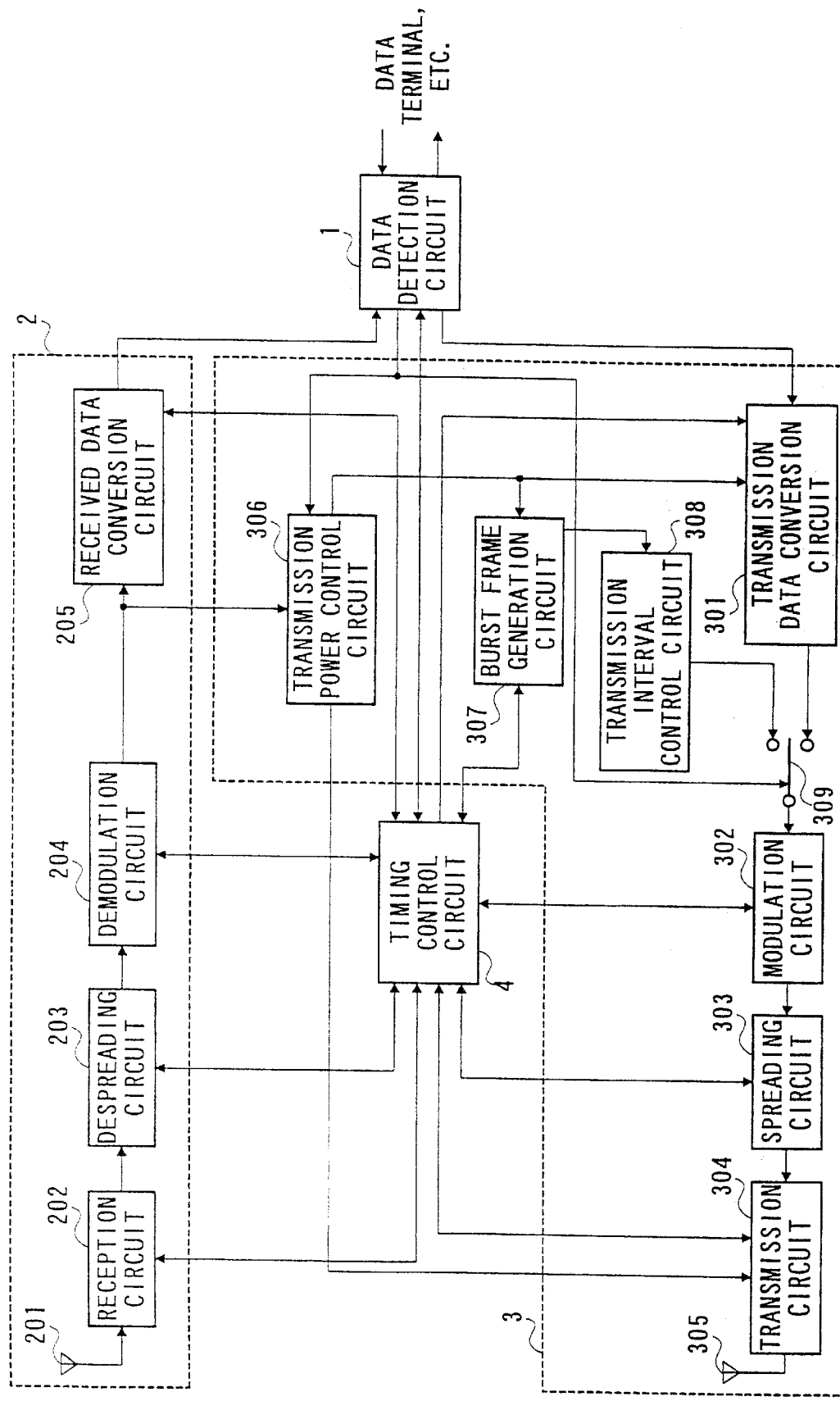
FIG. 2 is a block diagram showing the configuration of a CDMA mobile station apparatus in Embodiment 1 of the present invention.

FIG. 2 is a block diagram showing the configuration of a CDMA mobile station apparatus in Embodiment 1 of the present invention.

The CDMA mobile station apparatus shown in FIG. 2 mainly comprises data detection circuit 1 that carries out data transmission/reception with a data terminal, data reception section 2 that processes a received radio signal, data transmission section 3 that processes data to be transmitted by radio, and timing control circuit 4 that controls whole timing and sequence of signal processing.

Data reception section 2 comprises reception antenna 201 that receives a radio signal, reception circuit 202 that converts the frequency of the received signal to a baseband signal, despreading circuit 203 that performs the correlation detection on the baseband signal and extracts data directed to the own station, demodulation circuit 204 that demodulates the data directed to the own station, and received data conversion circuit 205 that separates the demodulated data into a control signal and voice data or data terminal data and performs a CRC detection.

Data transmission section 3 comprises transmission data conversion circuit 301 that inserts PLs and TPCs into data to be transmitted by radio forming a frame and carries out CRC coding, modulation circuit 302 that modulates the data combined into frames according to various modulation methods, spreading circuit 303 that spreads the modulated data, conversion/transmission circuit 304 that converts the spread signal to a signal with a desired carrier frequency, transmission antenna 305 that transmits the frequency-converted signal by radio, and transmission power control circuit 306 that determines transmission power and TPC according to the received signal and reception level, etc.

Furthermore, data transmission section 3 comprises burst frame generation circuit 307 that generates burst frames consisting solely of PLs and TPCs, transmission interval control circuit 308 that controls transmission intervals of burst data, and switch 309 that switches connections based on the control signal of data detection circuit 1.

Figure 3:
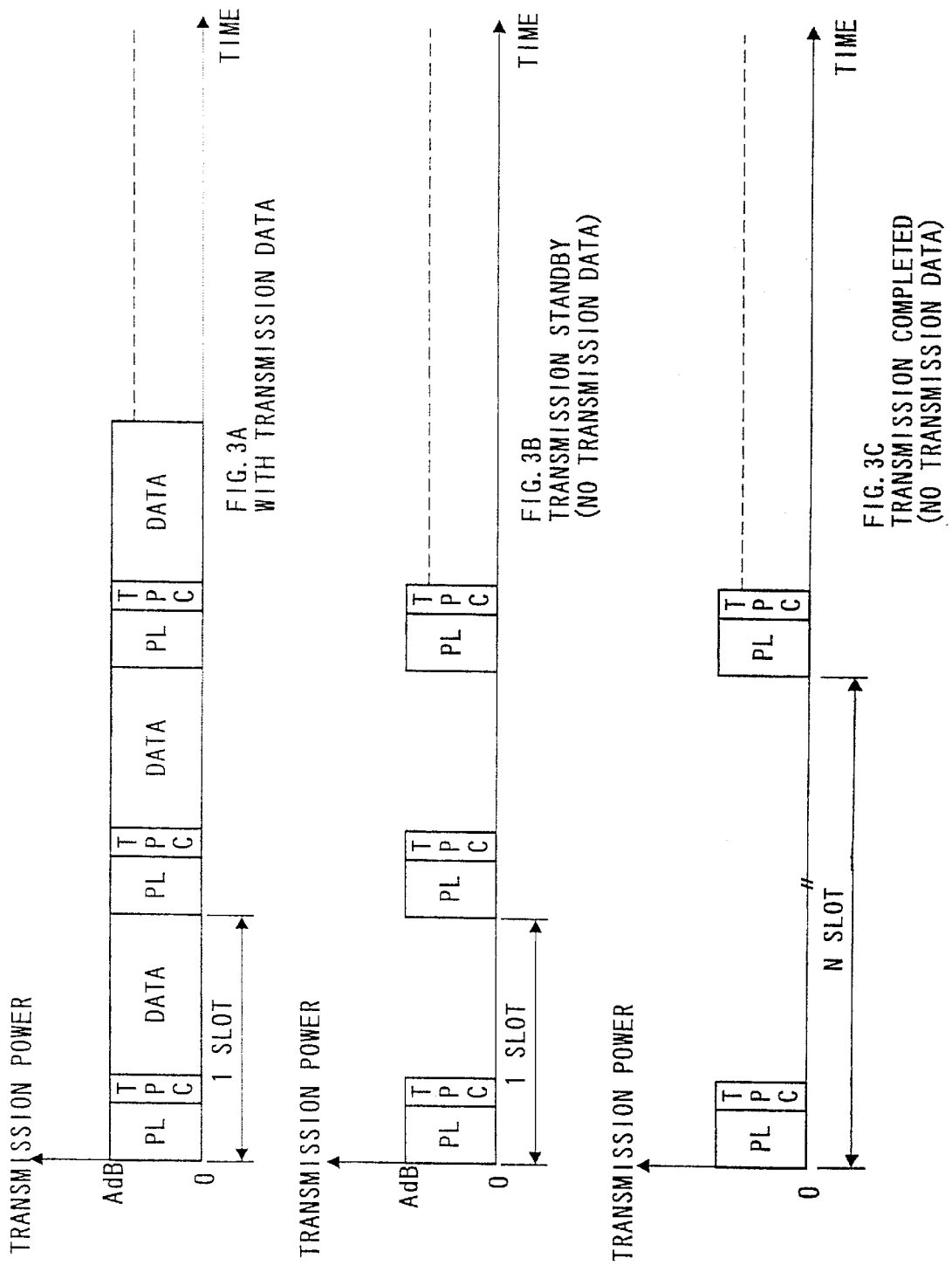
FIGS. 3A, 3B, and 3C are timing showing the transmission timing of data in the CDMA mobile station apparatus in Embodiment 1 of the present invention.

FIG. 3 is a timing chart showing the transmission timing of data in the CDMA mobile station apparatus in Embodiment 1. In the following timing charts, the time is plotted on the horizontal axis and transmission power is plotted on the vertical axis.

FIG. 3A is a timing chart showing the transmission timing of data during data transmission. As shown in FIG. 3A, PLs and TPCs are periodically inserted into the data output from data detection circuit 1 in transmission data conversion circuit 301, combined into a frame. Data combined into a frame are output to modulation circuit 302 via changeover switch 309.

Data detection circuit 1 controls switch 309 during data transmission so that transmission data conversion circuit 301 and modulation circuit 302 are connected. The data input to modulation circuit 302 are modulated according to various modulation methods, spread by spreading circuit 303, converted to a signal with a desired carrier frequency by transmission circuit 304 with transmission power controlled and transmitted by radio from transmission antenna 305.

On the other hand, data detection circuit 1 controls switch 309 so that transmission interval control circuit 308 and modulation circuit 302 are connected when there are no data to be transmitted.

Burst frame generation circuit 307 generates burst data in which only PLs and TPCs are written and other bits are left in blank when there are no data to be transmitted.

Transmission interval control circuit 308 controls the burst data transmission interval to one slot on transmission standby. "Transmission standby" means a time corresponding to less than K frames after completion of data transmission or a time corresponding to less than L frames in which a CRC detection of received data resulted in NG (K and L are predetermined constants). FIG. 3B is a timing chart showing the transmission timing of data on transmission standby.

Transmitting burst data when there are no data to be transmitted allows synchronization with the base station apparatus to be maintained, making it possible to restart communication immediately.

However, continuing transmission of burst data for a long time after the end of data transmission results in an increase of power consumption of batteries by a transmission amplifier.

On the other hand, if transmission of burst data is completely stopped, it takes time to establish synchronization with the base station apparatus when restarting transmission.

Therefore, transmission interval control circuit 308 controls the transmission interval of burst data to N times one slot (N: a natural number) at the end of transmission. The end of transmission means at least K frames after data transmission is completed and the time at which at least L frames are detected in each of which a CRC detection of received data resulted in NG. FIG. 3C is a timing chart showing the transmission timing of data at the end of transmission.

Burst data are output to modulation circuit 302 via changeover switch 309. The data input to modulation circuit 302 are modulated according to various modulation methods, spread by spreading circuit 303, converted to a signal with a desired carrier frequency by transmission circuit 304 with transmission power controlled and transmitted by radio from transmission antenna 305.

As described above, controlling the transmission interval of burst data to N times one slot makes it possible to reduce power consumption of batteries by a transmission amplifier, shorten the time until synchronization is established when restarting transmission, reduce transmission of a dummy signal, an unnecessary signal, thus improving the transmission efficiency. Furthermore, transmitting burst data in a slot with a free space makes it possible to reduce interference with other stations.

Here, the transmission interval of burst data may be non-cyclic. Using a non-cyclic transmission interval of burst data makes it possible to avoid hearing aid problems, eliminating the danger of affecting through resonance heart pacemakers.

EMBODIMENT 2

Figure 4:
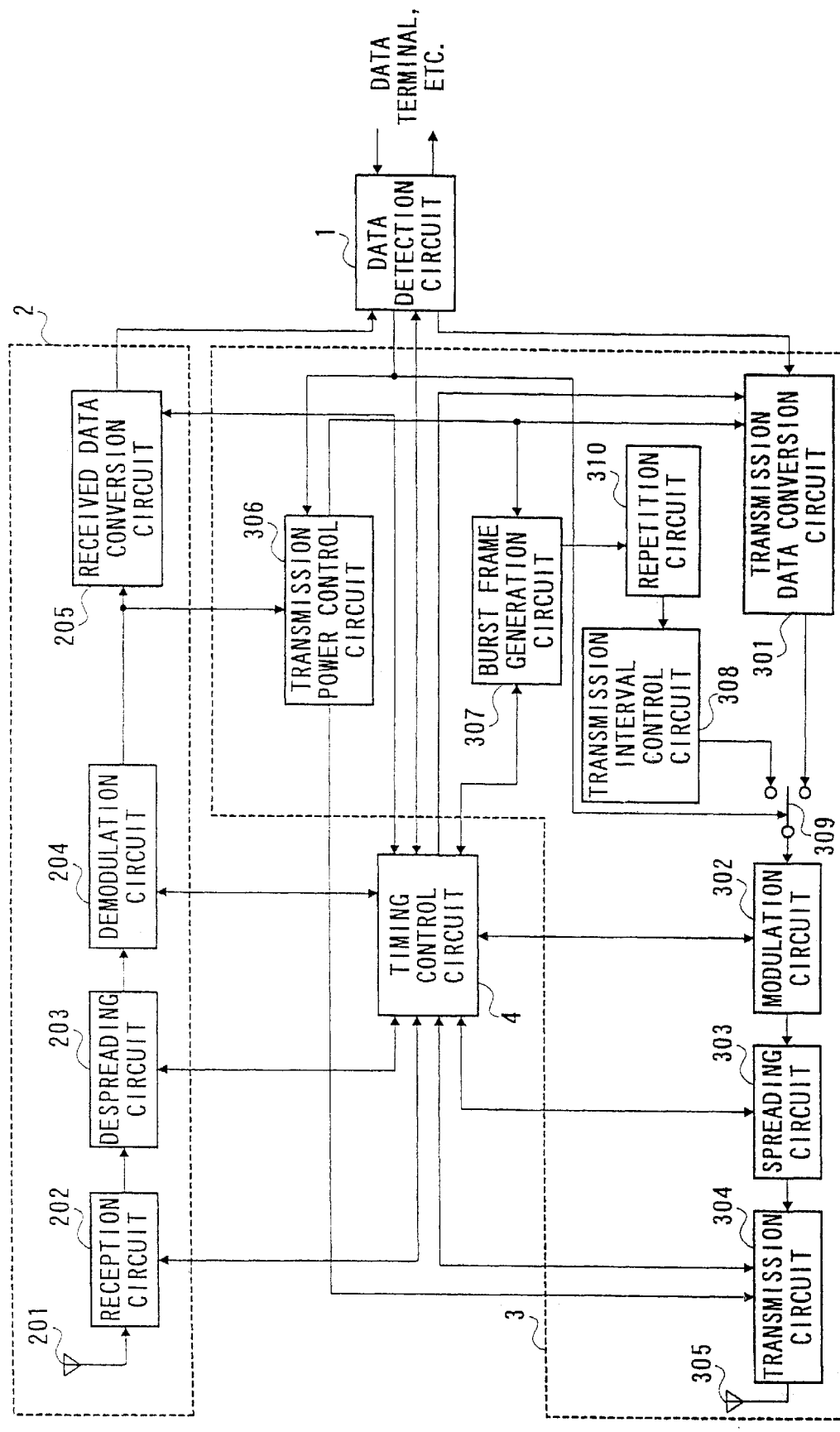
FIG. 4 is a block diagram showing the configuration of a CDMA mobile station apparatus in Embodiment 2 of the present invention.
Figure 5:
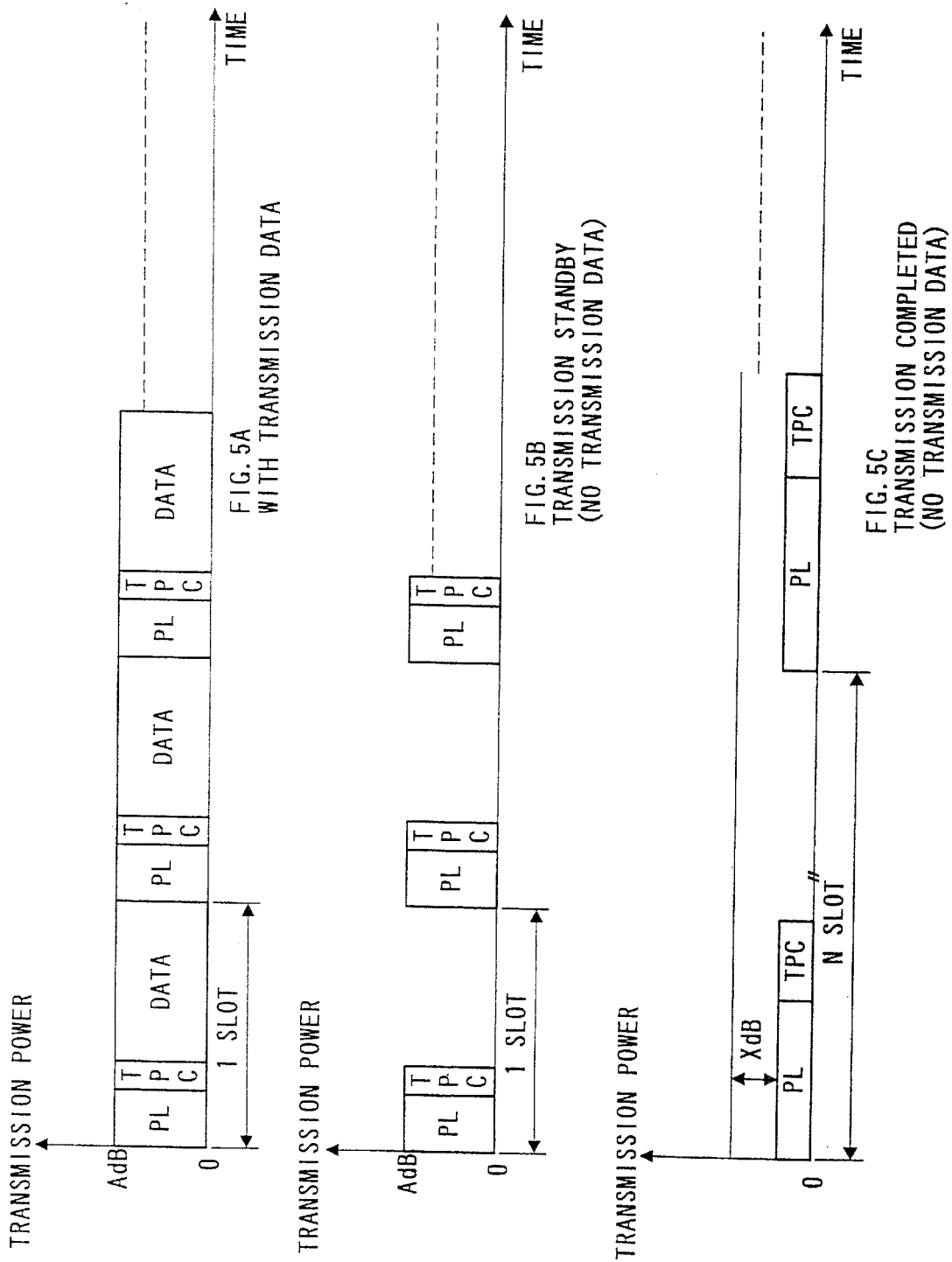
FIGS. 5A, 5B, and 5C are timing showing the transmission timing of data in the CDMA mobile station apparatus in Embodiment 2 of the present invention.

Then, Embodiment 2 is explained using FIG. 4 and FIG. 5.

Embodiment 2 is an embodiment which performs repetition processing on burst data at the end of transmission.

FIG. 4 is a block diagram showing the configuration of a CDMA mobile station apparatus in Embodiment 2. In the CDMA mobile station apparatus shown in FIG. 4, the same components as those in FIG. 2 are assigned the same numbers and their explanations are omitted.

FIG. 5 is a timing chart showing the transmission timing of data of the CDMA mobile station apparatus in Embodiment 2. FIG. 5A is a timing chart showing the transmission timing of data during data transmission and FIG. 5B is a timing chart showing the transmission timing of data on transmission standby. Since the transmission timing of data during data transmission and on transmission standby is the same as in FIG. 3, its explanation is omitted.

In comparison with FIG. 2, the CDMA mobile station apparatus shown in FIG. 4 is provided with repetition processing circuit 310 added to data transmission section 3.

Repetition processing circuit 310 performs repetition processing on PLs and TPCs of burst data input from burst frame generation circuit 307 at the end of transmission and outputs them to transmission interval control circuit 308. The repetition processing means processing of arranging the same information n times (n: a natural number) in series for PLs and TPCs.

Transmission interval control circuit 308 sets the transmission interval of burst data subjected to repetition processing N times (N: a natural number) one slot. FIG. 5C shows the transmission timing of data at the end of transmission.

Burst data are output to modulation circuit 302 via changeover switch 309. The data input to modulation circuit 302 are modulated according to various modulation methods, spread by spreading circuit 303 and output to transmission circuit 304.

Transmission circuit 304 controls the transmission power of burst data to 1/n of that prior to the repetition processing, converts the burst data to a signal with a desired carrier frequency and transmits it by radio from transmission antenna 305.

Repeating the same information n times (n: a natural number) and arranging them in series at the end of transmission can maintain synchronization even if the transmission power is reduced to 1/n of that prior to the repetition processing by transmission circuit 304, reducing interference with other stations. The transmission interval of burst data at the end of transmission may be non-cyclic.

EMBODIMENT 3

Figure 6:
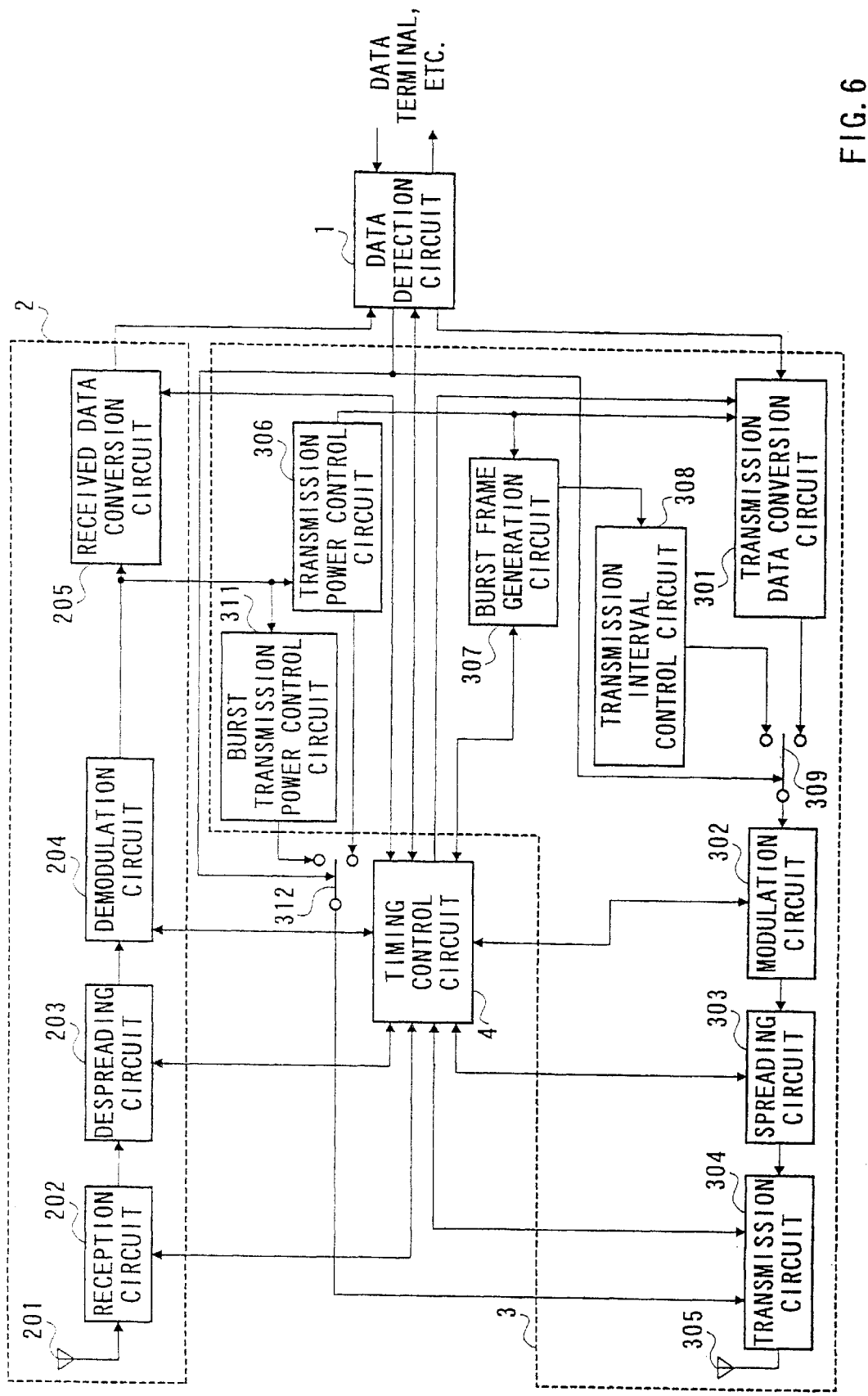
FIG. 6 is a 1st block diagram showing the configuration of a CDMA mobile station apparatus in Embodiment 3 of the present invention.

Then, Embodiment 3 is explained using FIG. 6 and FIG. 7.

Embodiment 3 is an embodiment which transmits burst data with a transmission power value extracted from the received data when the base station apparatus cannot transmit TPCs during non-cyclic transmission.

FIG. 6 is a block diagram showing the configuration of a CDMA mobile station apparatus in Embodiment 3 of the present invention. In the CDMA mobile station apparatus shown in FIG. 6, the same components as those in FIG. 2 are assigned the same numbers as in FIG. 2 and their explanations are omitted.

Figure 7A:
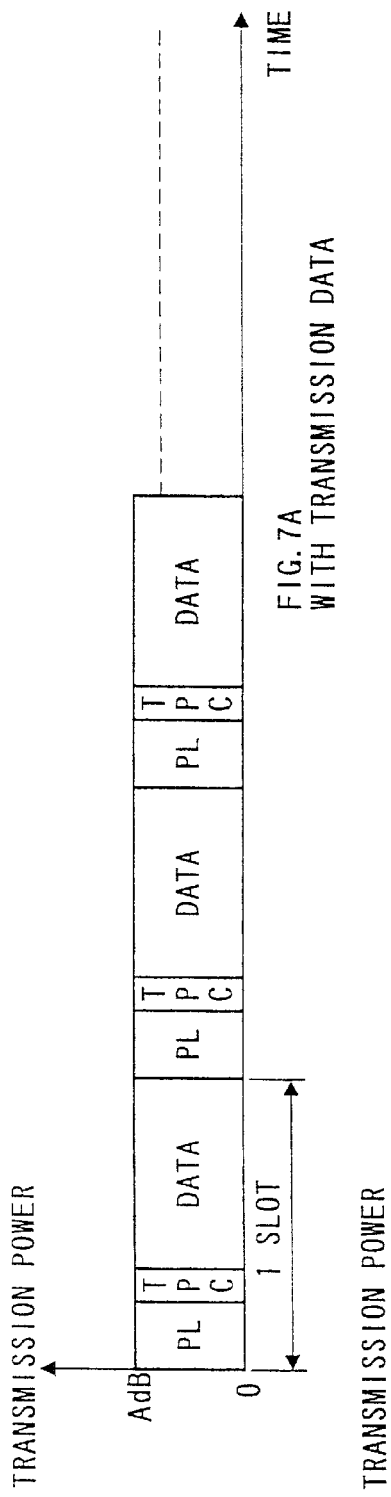
FIGS. 7A, 7B and 7C are 1st timing charts showing the transmission timing of data in the CDMA mobile station apparatus in Embodiment 3 of the present invention.
Figure 7B:
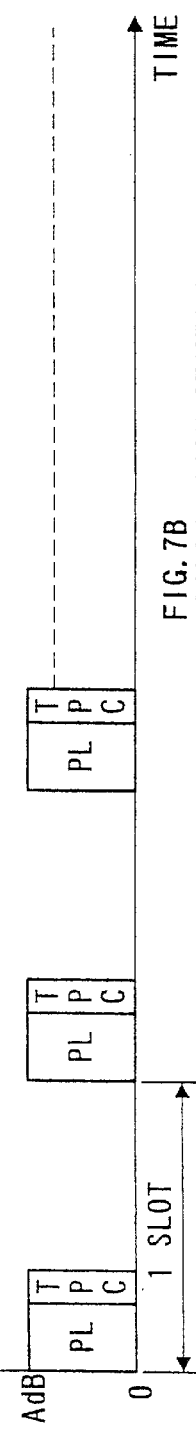

FIG. 7 is a timing chart showing the transmission timing of data of the CDMA mobile station apparatus in Embodiment 3. FIG. 7A is a timing chart showing the transmission timing of data during data transmission. FIG. 7B is a timing chart showing the transmission timing of data on transmission standby. Since the transmission timing of data during data transmission and on transmission standby is the same as in FIG. 3, its explanation is omitted.

In comparison with FIG. 2, the CDMA mobile station apparatus shown in FIG. 6 is provided with burst transmission power control circuit 311 that controls the transmission power value of burst data using the transmission power value extracted from the received data instead of TPCs and switch 312 that switches connections based on the control signal of data detection circuit 1 added to data transmission section 3.

Data detection circuit 1 controls switch 309 at the end of transmission so that transmission interval control circuit 308 and modulation circuit 302 are connected. It also controls switch 312 so that transmission circuit 304 and burst transmission power control circuit 311 are connected.

Burst frame generation circuit 307 generates burst frames only from PLs and burst transmission power control symbols (hereafter referred to as "BTPC") at the end of transmission and outputs the burst data to transmission interval control circuit 308. Information indicating the transmission power value is written to the BTPC and the base station transmits the signal with the transmission power value written to the BTPC.

Transmission interval control circuit 308 sets the burst data transmission interval to N times (N: a natural number) one slot at the end of transmission and sets it non-cyclic. Setting the burst data transmission interval non-cyclic can avoid hearing aid problems, eliminating the danger of affecting through resonance heart pacemakers.

Burst data are output to modulation circuit 302 via changeover switch 309. The data input to modulation circuit 302 are modulated according to various modulation methods, spread by spreading circuit 303 and output to transmission circuit 304.

Transmission circuit 304 inputs the transmission power value extracted from the received data from burst transmission power control circuit 311 at the end of transmission, controls the transmission power of the burst data to the same value as the transmission power value extracted from the received data, converts it to a signal with a desired carrier frequency and transmits it by radio from transmission antenna 305.

Figure 7C:
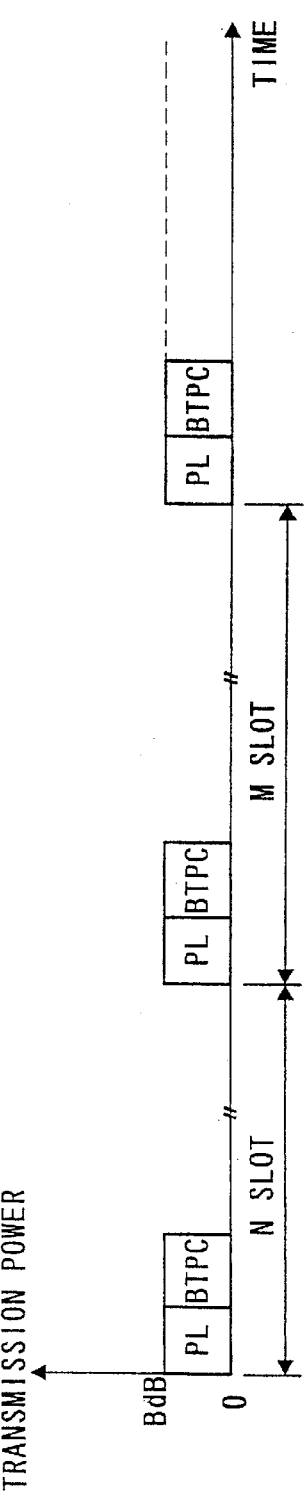

FIG. 7C is a timing chart showing the transmission timing of data at the end of transmission and transmission power value BdB at the end of transmission is the same as the transmission power value extracted from the received data.

Thus, during non-cyclic transmission when the base station apparatus cannot transmit TPCs, transmission circuit 304 sets the data transmission power to the same value as the transmission power value extracted from the received data, preventing it from interfering other stations by transmitting too high a power value and preventing it from failing to maintain synchronization by transmitting too low a power value.

Figure 8:
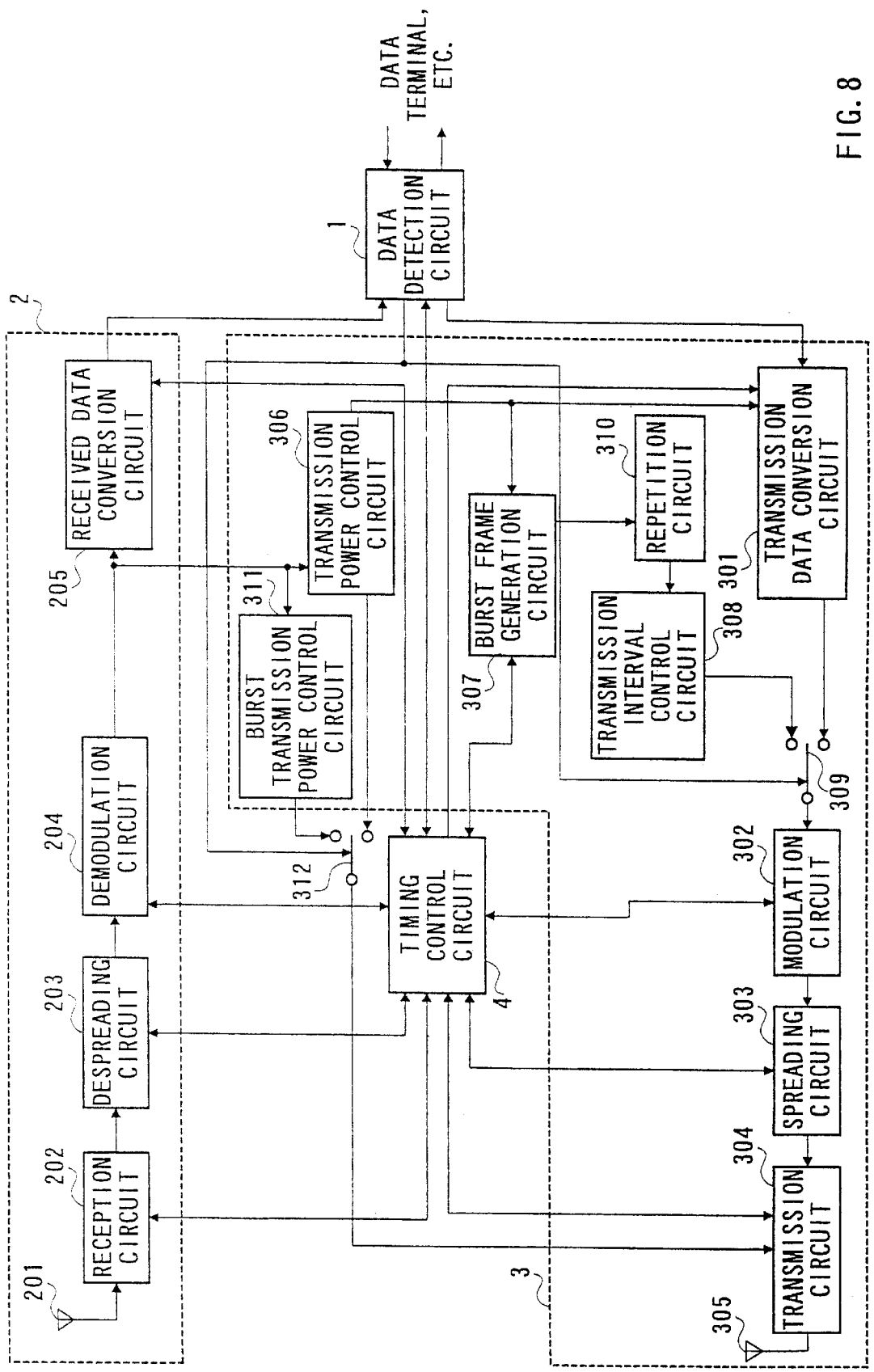
FIG. 8 is a 2nd block diagram showing the configuration of the CDMA mobile station apparatus in Embodiment 3 of the present invention.

It is also possible to perform repetition processing on burst data by adding repetition processing circuit 310 to Embodiment 3. FIG. 8 is a block diagram showing a 2nd configuration of the CDMA mobile station apparatus in Embodiment 3 and repetition processing circuit 310 is added to FIG. 6. FIG. 9 is a 2nd timing chart showing the data transmission timing of the CDMA mobile station apparatus in Embodiment 3 which performs repetition processing on FIG. 7 at the end of transmission.

Carrying out repetition processing allows synchronization to be maintained even if the transmission power value is reduced by transmission circuit 304, making it possible to reduce interference with other stations.

As explained above, according to the CDMA transmission apparatus and CDMA transmission method of the present invention, the burst data transmission interval can be controlled when there are no data to be transmitted, making it possible to maintain synchronization while reducing power consumption.

What is claimed is:

1. A CDMA mobile station apparatus comprising:
   transmission frame generation means for generating frames by inserting pilot symbols and transmission power control symbols into transmission data;
   burst frame generation means for generating burst frames comprising pilot symbols and transmission power control symbols and no transmission data;
   transmission interval control means for controlling a transmission interval of said burst frames to cyclically once every N slots; and
   transmission means for transmitting said transmission data and said burst frames by radio.

2. The CDMA mobile station apparatus according to claim 1, comprising:
   repetition processing means for arranging pilot symbols and transmission power control symbols in series respectively.

3. A CDMA base station apparatus, which performs cellular radio communications with the CDMA mobile station apparatus according to claim 1.

4. A CDMA mobile station apparatus comprising:
   transmission frame generation means for generating frames by inserting pilot symbols and transmission power control symbols into transmission data;

burst frame generation means for generating burst frames comprising pilot symbols and burst transmission power symbols and no transmission data;

transmission interval control means for controlling a transmission interval of said burst frames to cyclically once every N slots; and transmission means for transmitting said transmission data and said burst frames by radio, wherein
said transmission means transmits said burst frames with a same value as a transmission power value extracted from received data.

5. A CDMA transmission method comprising:
(a) generating transmission frames by inserting pilot symbols and transmission power control symbols into transmission data,
(b) transmitting transmission data by radio,
(c) generating burst frames comprising pilot symbols and transmission power control symbols and no transmission data when there are no transmission data to be transmitted, and
(d) transmitting said burst frames by radio by controlling transmission intervals to cyclically once every N slots.

6. The CDMA transmission method according to claim 5, wherein prior to step (d) said burst frames are subjected to processing including arranging in said burst frames said pilot symbols and said transmission power control symbols in series respectively.

7. A CDMA transmission method comprising:
(a) generating transmission frames by inserting pilot symbols and transmission power control symbols into transmission data,
(b) transmitting transmission data by radio,
(c) generating burst frames comprising pilot symbols and burst transmission power symbols and no transmission data when there are no transmission data to be transmitted, and
(d) transmitting said burst frames by radio by controlling transmission intervals to cyclically once every N slots and setting a burst frames transmission power value at a same value as a transmission power value extracted from received data.

8. A CDMA mobile station apparatus comprising:
transmission frame generation means for generating frames by inserting pilot symbols and transmission power control symbols into transmission data;
burst frame generation means for generating burst frames comprising pilot symbols and transmission power control symbols and no transmission data;
transmission interval control means for controlling a transmission interval of said burst frames to non-cyclically; and
transmission means for transmitting said transmission data and said burst frames by radio.

9. A CDMA mobile station apparatus comprising:
transmission frame generation means for generating frames by inserting pilot symbols and transmission power control symbols into transmission data;
burst frame generation means for generating burst frames comprising pilot symbols and burst transmission power symbols and no transmission data;
transmission interval control means for controlling a transmission interval of said burst frames to non-cyclically; and
transmission means for transmitting said transmission data and said burst frames by radio, wherein:
said transmission means transmits said burst frames with a same value as a transmission power value extracted from received data.

10. A CDMA transmission method comprising:
(a) generating transmission frames by inserting pilot symbols and transmission power control symbols into transmission data,
(b) transmitting transmission data by radio,
(c) generating burst frames comprising pilot symbols and transmission power control symbols and no transmission data when there are no transmission data to be transmitted, and
(d) transmitting said burst frames by radio by controlling transmission intervals to non-cyclically.

11. A CDMA transmission method comprising:
(a) generating transmission frames by inserting pilot symbols and transmission power control symbols into transmission data,
(b) transmitting transmission data by radio,
(c) generating burst frames comprising pilot symbols and burst transmission power symbols and no transmission data when there are no transmission data to be transmitted, and
(d) transmitting said burst frames by radio by controlling transmission intervals to non-cyclically and setting a burst frames transmission power value at a same value as a transmission power value extracted from received data.

12. A mobile station apparatus comprising:
a transmission frame generator that generates frames by inserting pilot symbols and transmission power control symbols into transmission data;
a burst frame generator that generates burst frames comprising pilot symbols and transmission power control symbols and no transmission data;
a transmission interval controller that controls a transmission interval of said burst frames to cyclically once every N slots; and
a transmitter that transmits said transmission data and said burst frames by radio.

13. A base station apparatus, which performs cellular radio communications with the mobile station apparatus according to claim 12.

14. A mobile station apparatus comprising:
a transmission frame generator that generates frames by inserting pilot symbols and transmission power control symbols into transmission data;
a burst frame generator that generates burst frames comprising pilot symbols and burst transmission power symbols and no transmission data;
a transmission interval controller that controls a transmission interval of said burst frames to cyclically once every N slots; and
a transmitter that transmits said transmission data and said burst frames by radio, wherein:
said transmitter transmits said burst frames with a same value as a transmission power value extracted from received data.

15. A transmission method comprising:
(a) generating transmission frames by inserting pilot symbols and transmission power control symbols into transmission data,
(b) transmitting transmission data by radio,
(c) generating burst frames comprising pilot symbols and transmission power control symbols and no transmission data when there are no transmission data to be transmitted, and (d) transmitting said burst frames by radio by controlling transmission intervals to cyclically once every N slots.

16. The transmission method according to claim 15, wherein prior to step (d) said burst frames are subjected to processing including arranging in said burst frames said pilot symbols and said transmission power control symbols in series respectively.

17. A transmission method comprising:
(a) generating transmission frames by inserting pilot symbols and transmission power control symbols into transmission data,
(b) transmitting transmission data by radio,
(c) generating burst frames comprising pilot symbols and burst transmission power symbols and no transmission data when there are no transmission data to be transmitted, and
(d) transmitting said burst frames by radio by controlling transmission intervals to cyclically once every N slots and setting a burst frames transmission power value at a same value as a transmission power value extracted from received data.

18. A mobile station apparatus comprising:
a transmission frame generator that generates frames by inserting pilot symbols and transmission power control symbols into transmission data;
a burst frame generator that generates burst frames comprising pilot symbols and transmission power control symbols and no transmission data;
a transmission interval controller that controls a transmission interval of said burst frames to non-cyclically; and
a transmitter that transmits said transmission data and said burst frames by radio.

19. A mobile station apparatus comprising:
transmission frame generator that generates frames by inserting pilot symbols and transmission power control symbols into transmission data;
burst frame generator that generates burst frames comprising pilot symbols and burst transmission power symbols and no transmission data;
a transmission interval controller that controls a transmission interval of said burst frames to non-cyclically; and
a transmitter that transmits said transmission data and said burst frames by radio, wherein:
said transmitter transmits said burst frames with a same value as a transmission power value extracted from received data.

20. A transmission method comprising:
(a) generating transmission frames by inserting pilot symbols and transmission power control symbols into transmission data,
(b) transmitting transmission data by radio,
(c) generating burst frames comprising pilot symbols and transmission power control symbols and no transmission data when there are no transmission data to be transmitted, and
(d) transmitting said burst frames by radio by controlling transmission intervals to non-cyclically.

21. A transmission method comprising:
(a) generating transmission frames by inserting pilot symbols and transmission power control symbols into transmission data,
(b) transmitting transmission data by radio,
(c) generating burst frames comprising pilot symbols and burst transmission power symbols and no transmission data when there are no transmission data to be transmitted, and
(d) transmitting said burst frames by radio by controlling transmission intervals to non-cyclically and setting a burst frames transmission power value at a same value as a transmission power value extracted from received data.

* * * * *